United States Patent
McCullough et al.

(10) Patent No.: US 9,034,285 B1
(45) Date of Patent: May 19, 2015

(54) USE OF FERROUS SULFIDE SUSPENSION FOR THE REMOVAL OF MERCURY FROM FLUE GASES

(71) Applicant: Redox Technology Group, LLC, Carmel, IN (US)

(72) Inventors: Thomas P. McCullough, Carmel, IN (US); Gary Joel Meyer, Indianapolis, IN (US); Ralph E. Roper, Jr., Carmel, IN (US); Anthony J. Kriech, Indianapoils, IN (US)

(73) Assignee: Redox Technology Group LLC, Indianapolis, IN (US)

( * ) Notice: Subject to any disclaimer, the term of this patent is extended or adjusted under 35 U.S.C. 154(b) by 0 days.

(21) Appl. No.: 14/193,973

(22) Filed: Feb. 28, 2014

(51) Int. Cl.
*B01D 53/64* (2006.01)
*C01G 49/12* (2006.01)
*C09K 3/00* (2006.01)

(52) U.S. Cl.
CPC ............... *B01D 53/64* (2013.01); *C01G 49/12* (2013.01)

(58) Field of Classification Search
CPC ........... B01D 53/64; C01G 49/12; C09K 3/00
USPC .................. 252/184, 182.32, 182.35, 183.14; 95/134; 423/210
See application file for complete search history.

(56) References Cited

U.S. PATENT DOCUMENTS

| | | | |
|---|---|---|---|
| 4,726,939 A | 2/1988 | Touro | |
| 4,915,818 A | 4/1990 | Yan | |
| 4,962,276 A | 10/1990 | Yan | |
| 5,037,552 A | 8/1991 | Furuta et al. | |
| 6,284,199 B1 | 9/2001 | Downs et al. | |
| 6,503,470 B1 * | 1/2003 | Nolan et al. | 423/210 |
| 6,719,828 B1 | 4/2004 | Lovell et al. | |
| 6,855,859 B2 | 2/2005 | Nolan et al. | |
| 7,288,499 B1 | 10/2007 | Lovell et al. | |
| 7,575,629 B2 | 8/2009 | Yang et al. | |
| 7,704,920 B2 | 4/2010 | Yang et al. | |
| 7,790,830 B2 | 9/2010 | Edmiston | |
| 8,088,283 B2 | 1/2012 | Pate | |
| 8,119,759 B2 | 2/2012 | Edmiston | |
| 8,197,687 B2 | 6/2012 | Krogue et al. | |
| 8,217,131 B2 | 7/2012 | Edmiston | |
| 8,412,664 B2 | 4/2013 | Shankle | |
| 8,734,740 B1 * | 5/2014 | Wang et al. | 423/210 |
| 2003/0091490 A1 | 5/2003 | Nolan et al. | |
| 2003/0103882 A1 | 6/2003 | Biermann et al. | |

(Continued)

FOREIGN PATENT DOCUMENTS

JP 62-140629 A * 6/1987 .................... 423/210

OTHER PUBLICATIONS

Ghorishi, B, et al., "Role of Sulfides in the Sequestration of Mercury by Wet Scrubbers", Presented to: EPRI-DOE-EPA-AWMA, Combined Power Plant Air Pollutant Control Mega Symposium, Aug. 28-31, 2006, Baltimore Maryland (7 pgs).
English translation of JP62-140,629 A as cited in the Office Action dated Oct. 8, 2014 for U.S. Appl. No. 14/193,973 herein (13 pgs).

*Primary Examiner* — Timothy Vanoy
(74) *Attorney, Agent, or Firm* — Brinks Gilson & Lione

(57) ABSTRACT

A ferrous sulfide suspension that includes at least FeSm and $Al(OH)_3$ and which can be used to reduce mercury emissions in flue gases. Through a combination of complex chemical reactions, precipitation, co-precipitation, and surface adsorption the ferrous sulfide suspension of the present invention effectively removes mercury from gaseous streams while concurrently preventing mercury re-emission.

12 Claims, 2 Drawing Sheets

(56) References Cited

U.S. PATENT DOCUMENTS

| | | |
|---|---|---|
| 2007/0092418 A1 | 4/2007 | Mauldin et al. |
| 2007/0119300 A1* | 5/2007 | Yang et al. ............... 95/107 |
| 2012/0103912 A1* | 5/2012 | Hetherington et al. ....... 210/688 |
| 2012/0135214 A1 | 5/2012 | Dawes et al. |

* cited by examiner

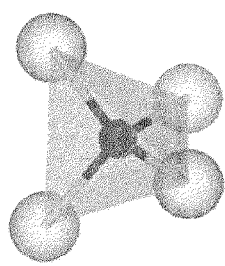
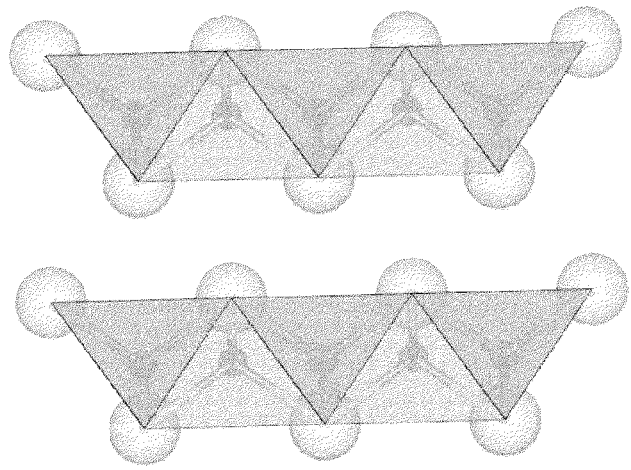
FIG - 1a  FIG - 1b
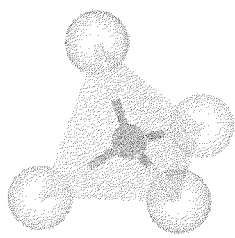
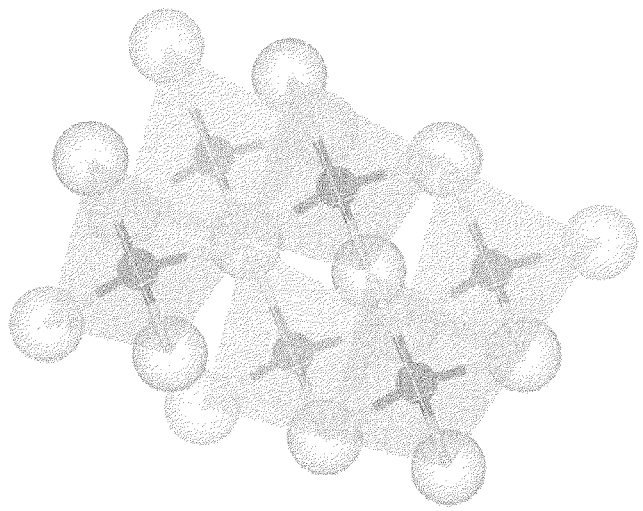
FIG - 2a  FIG - 2b

USE OF FERROUS SULFIDE SUSPENSION FOR THE REMOVAL OF MERCURY FROM FLUE GASES

BACKGROUND

The present invention relates generally to a ferrous sulfide suspension, including a method for producing the ferrous sulfide suspension and methods for using the ferrous sulfide suspension for the treatment and removal of mercury from flue gases.

The emission of pollutants from coal-fired boilers is a major environmental concern. In particular, the emission of mercury into the atmosphere from these sources has garnered increased attention as a threat to human health and the environment since mercury, even at low concentrations, is a neurotoxin. Mercury is contained in varying concentrations in different coal sources and therefore the total quantity of mercury emitted into the atmosphere from the combustion of coal varies significantly between facilities.

During combustion of the coal, mercury is released in flue gases in the form of elemental mercury ($Hg^0$). As the combustion gases cool, a portion of the mercury transforms to ionic or oxidized mercury ($Hg^{2+}$) in the gas stream. As a result, there are three possible forms of mercury in the gas stream that may be emitted to the atmosphere—elemental) ($Hg^0$), ionic or oxidized ($Hg^{2+}$), or mercury that is bound onto particulates or fly ash also contained in the gas stream ($Hg_{(p)}$).

The conversion of elemental mercury ($Hg^0$) to the other forms of mercury is dependent upon several factors, including but not limited to, the cooling rate of the gas stream, the presence of halogens or sulfurous species (e.g. chlorines, bromines, $SO_3^{2-}$), the amount and composition of fly ash, the presence of unburned carbon, and the removal efficiency of any installed air pollution control equipment. Considering the complex interaction of these various parameters, the form of mercury ultimately released to the atmosphere varies between 10% and 90%, 5% and 15%, and 10% and 90% of the total mercury for elemental, ionic, and particle bound species, respectively.

Mercury and other pollutants may be captured and removed from flue gas streams by injection of a dry sorbent into the exhaust stream with subsequent collection in a particulate matter control device such as an electrostatic precipitator or a fabric filter. These systems are collectively referred to as "dry scrubber" systems. Of the known dry sorbents for mercury removal, activated carbon and calcium-based sorbents have been the most actively studied and most widely used on commercially.

Currently, the most commonly used sorbent in dry scrubber systems for mercury emission reduction is the injection of powdered activated carbon (PAC) into the flue gas stream of coal-fired and oil-fired plants. Although powdered activated carbon is effective in capturing ionic or oxidized mercury species ($Hg^{+2}$), powdered activated carbon is not as effective for the removal of elemental mercury ($Hg^0$) which may constitute a significant percentage of the mercury species in flue gases, especially from facilities that use subbituminous coals and lignite fuel sources. There have been efforts to enhance the trapping efficiency of elemental mercury ($Hg^0$) in these systems by incorporating or impregnating the PAC with a bromine species.

Examples of other sorbents that have been used for mercury removal in dry scrubber systems include those disclosed in U.S. Patent Application Publication No. 2003/0103882 to Biermann et al and in U.S. Pat. No. 6,719,828 to Lovell et al. which discloses the preparation of layered sorbents such as clays with metal sulfides interlayered between the clay layers. Other patents for mercury capture by injection of dry sorbents are based upon preparation of the sorbents by thinly layering a chemical compound onto or into a substrate. These types of sorbents use substrates that include sol-gel derivatives as disclosed in U.S. Pat. No. 7,790,830 to Edmiston; U.S. Pat. No. 8,119,759 to Edmiston; and U.S. Pat. No. 8,217,131 to Edmiston, self-assembled monolayers on mesoporous supports as disclosed in U.S. Pat. No. 8,088,283 to Pate; U.S. Pat. No. 8,412,664 to Shankle; and U.S. Pat. No. 8,197,687 to Krogue et al., phyllosilicates as disclosed in U.S. Pat. No. 7,288,499 to Lovell et al., or variety of other substrates. In addition to these U.S. Pat. No. 7,575,629 to Yang et al. and U.S. Pat. No. 7,704,920 to Yang et al. disclose that any metal salt that can release a metal ion when the salt contacts a sulfide salt forming a water insoluble metal sulfide on the substrate surface can be used to produce an effective dry sorbent for mercury removal.

The production and use of these sorbent dry scrubbers for the removal of mercury from flue gases are complex and expensive.

Another type of scrubber system that is used to reduce the emission of mercury and other toxic gaseous pollutants to the environment are commonly referred to as "wet scrubbers". In a wet scrubber system, polluted gases are brought into contact with a scrubbing liquid, either by spraying the gases with the liquid, by forcing the gases through a pool of liquid, or by some other contact method, so as to capture and remove pollutants. The liquid compositions used in these wet scrubbers vary depending upon the pollutant targeted for removal. For example, in a wet flue gas desulfurization device (WFGD) used to remove acid gases such as sulfur dioxide ($SO_2$), a sorbent slurry containing limestone ($CaCO_3$), oxides or hydroxides of calcium or magnesium, or other mixtures are primarily used.

Elemental mercury is fairly insoluble in water (approximately 50 µg/L). Hence, elemental mercury is not effectively removed in wet scrubber systems. Therefore, processes upstream of wet scrubbers that oxidize $Hg^0$ in flue gases to $Hg^{2+}$ will improve the effectiveness of overall mercury removal by the downstream wet scrubber systems. Since gas phase oxidation is kinetically limited, the need to oxidize any $Hg^0$ to $Hg^{2+}$, keep any $Hg^{2+}$ from being reduced back to $Hg^0$ (sometimes referred to as "reconversion" or "re-emission") and then finally capturing the $Hg^{2+}$ in the wet scrubber process is essential for mercury removal.

Reactions with other ionic species in the gas stream and scrubber liquid also may have a significant impact on the ability of wet scrubber systems to remove $Hg^{2+}$ and the extent reconversion of $Hg^{2+}$ to $Hg^0$. In "Role of Sulfides in the Sequestration of Mercury by Wet Scrubbers," B. Ghorishi et al. as presented at the EPRI-DOE-EPA-AWMA Combined Power Plant Air Pollutant Control Mega Symposium Aug. 28-31, 2006 in Baltimore, Md., the authors proposed that once $Hg^{2+}$ dissolves and ionizes in solution, it may be subject to reactions with other dissolved constituents in the scrubber slurry. In the case of impurities such as divalent iron ($Fe^{2+}$), the authors theorized that the reduction of $Hg^{2+}$ to $Hg^0$ may occur by the following reaction:

  (1)

Further, in the presence of an aqueous sulfide ions, ionic or oxidized mercury ($Hg^{2+}$) precipitates as HgS and effectively sequesters the $Hg^{2+}$ as an insoluble solid according to the following reaction:

  (2)

Since reactions (1) and (2) occur simultaneously in wet scrubber systems, the amount of $Hg^0$ subject to re-emission (reconversion) becomes a "race between the mercury reduction reactions" and the precipitation of $Hg^{2+}$ as HgS. At $Fe^{2+}$ concentrations of less than 1300 ppm in the scrubber liquor, all of the Hg is in the form of HgS and thus no $Hg^0$ re-emission occurs. At higher $Fe^{2+}$ concentrations (more than 1300 ppm) and higher pH (>4), any mercury has a higher tendency to be re-emitted as $Hg^0$.

Based on the above research, U.S. Pat. No. 6,284,199 to Downs et al., U.S. Pat. No. 6,503,470 to Nolan et al. and U.S. Pat. No. 6,855,859 to Nolan et al, each disclose methods to minimize the potential of this re-emission (reconversion) of the ionic or oxidized mercury ($Hg^{2+}$) at the gas/liquid interface before it can be reduced by transition metals that may be present as impurities in the scrubber liquid. Various means for supplying an aqueous source of sulfide ions to react with the oxidized mercury at the gas/liquid interface in the wet scrubber for the absorption and precipitation of ionized (oxidized) mercury include injecting a mixture of air and hydrogen sulfide (U.S. Pat. No. 6,284,199 to Downs et al.) or from addition of aqueous sulfide species into the scrubber liquid that are selected from sulfidic waste water, kraft caustic liquor, kraft carbonate liquor, potassium sulfide and sodium sulfide. To further inhibit the reconversion of $Hg^{2+}$ to $Hg^0$, U.S. Pat. No. 6,855,859 to Nolan et al. discloses an additional step whereby an oxidizing agent is first added to the scrubber liquid to convert any $Hg^0$ present to $Hg^{2+}$ in the flue gas prior to treatment of the $Hg^{2+}$ with an aqueous sulfide ion.

The known prior art related to mercury removal mechanisms by wet scrubbers systems rely upon absorption of ionic or oxidized mercury ($Hg^{2+}$) by an aqueous sulfide ion. In these cases, absorption is a phenomenon whereby atoms, molecules, or ions that are present in the gas stream are absorbed (taken up) by the volume of the bulk (liquid) phase. On the other hand, "adsorption" is a physical phenomenon where atoms, ions, or molecules from a gas, liquid, or dissolved solid adhere (bind) to another solid surface. The exact nature of the bonding by adsorption is dependent upon the species involved, but the adsorption process is generally classified as physisorption (characteristic of weak van der Waals forces), chemisorption (characteristic of covalent bonding), or some other type of electrostatic attraction. In other words, absorption is the process through which a substance, originally present in one phase, is removed from that phase by dissolution into another phase (typically a liquid), as opposed adsorption which is the accumulation of atoms, ions, or molecules from a bulk liquid or gas onto a solid surface.

Since the environment in a wet scrubber system is dynamic, removal of mercury from the flue gas stream is complex. Any successful mercury removal methodology must account for the various equilibrium conditions present between the mercury in the flue gas stream, and the other various ions, chemical complexes, or chemical compounds also contained within the flue gas entering the wet scrubber.

Once the flue gas containing mercury and the other various ions, chemical complexes, or chemical compounds enters the wet scrubber, the successful removal of the mercury from the flue gas stream is predicated on concurrently controlling the equilibrium conditions that are a result of interactions between the mercury containing flue gas and the solid, liquid, and gaseous phases present (or created) in the wet scrubber.

The present invention overcomes the disadvantage of using sorbents in dry scrubbers which are primarily based on adsorption of mercury onto the sorbent and the disadvantage of wet scrubber systems which are based upon the absorption of mercury by aqueous sulfide ions in the scrubber liquid to form an insoluble mercuric sulfide precipitant.

BRIEF SUMMARY

According to various features, characteristics and embodiments of the present invention which will become apparent as the description thereof proceeds, the present invention provides a reagent for removal of mercury from industrial gases containing elemental and oxidized mercury which reagent comprises a ferrous sulfide suspension that is produced by the steps of:

a) reacting any aqueous solution, including but not limited to, a caustic byproduct that contains at least $NaAlO_2$ and NaOH with any aqueous solution, including but not limited to, a pickle liquor that contains $FeCl_2$, HCl and water to form a reaction mixture that contains $Al^{3+}$, $Fe^{2+}$, $Cl^-$, $Na^+$, $Cl^-$ and $H_2O$; and b) adding a sulfide source, including but not limited to, NaHS to the reaction mixture of step a) to form a ferrous sulfide suspension that contains at least FeS and $Al(OH)_3$.

The present invention further provides a method of reducing mercury emissions from an industrial gas containing elemental and oxidized mercury in a wet scrubber system containing an aqueous ferrous sulfide suspension which method comprises:

a) creating a gas-liquid interface within the scrubber and contacting the industrial gas with the ferrous sulfide suspension containing aluminum hydroxide so as to cause at least one of:

i) adsorption of the oxidized or ionic mercury from the industrial gas onto the surface of ferrous sulfide or aluminum hydroxide in the ferrous sulfide suspension containing aluminum hydroxide;

ii) adsorption of the oxidized or ionic mercury onto iron (hydr)-oxides that may be initially present or created as reaction products in the suspension ferrous sulfide suspension containing aluminum hydroxide; and iii) precipitation of the oxidized or ionic mercury at a gas-liquid interface as a mercuric sulfide; and b) thereby reduce mercury emissions from an industrial gas.

BRIEF DESCRIPTION OF THE DRAWINGS

The present invention will be described with reference to the attached drawings which are given as non-limiting examples only, in which:

FIGS. 1a and 1b represent a "single cell" and a "sheet" of FeS, respectively.

FIGS. 2a and 2b represent a "single cell" and a "sheet" of metacinnabar (β-HgS), respectively.

DETAILED DESCRIPTION OF THE DRAWINGS AND THE PRESENTLY PREFERRED EMBODIMENTS

Figure 3:
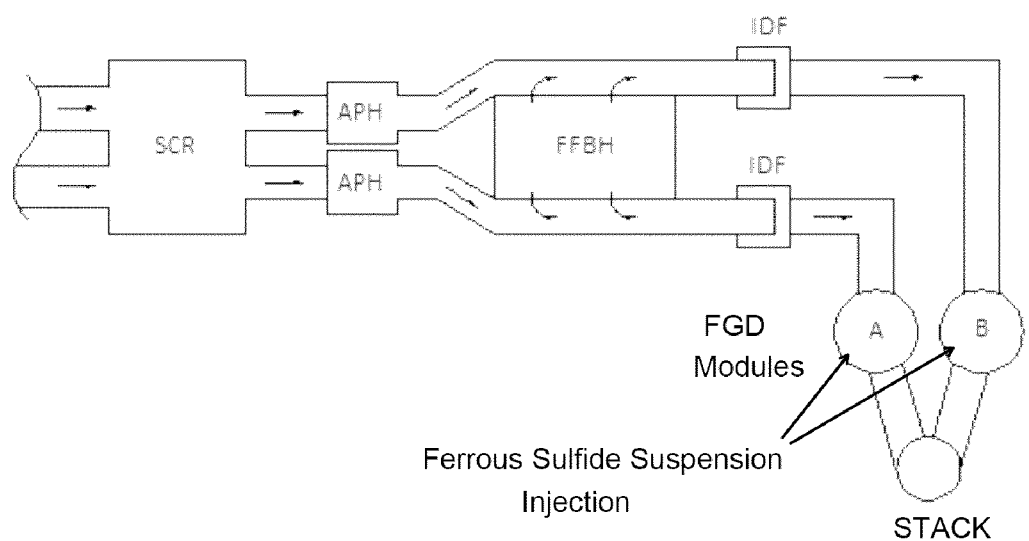
FIG. 3 is schematic diagram of a coal-fired boiler having dual wet FGD scrubber systems.

The present invention provides a ferrous sulfide suspension containing aluminum hydroxide, a method for producing the ferrous sulfide suspension containing aluminum hydroxide, and methods for using the ferrous sulfide suspension containing aluminum hydroxide for the treatment and removal of mercury from flue gases.

The ferrous sulfide suspension containing aluminum hydroxide of the present invention is a minimally soluble, colloidal suspension that can be used to enhance the total mercury removal capabilities of wet FGD scrubber systems.

Through a combination of complex chemical reactions, precipitation, co-precipitation, and surface adsorption the ferrous sulfide suspension containing aluminum hydroxide of the present invention can effectively remove mercury from gaseous streams while concurrently preventing mercury re-emission. Mercury re-emission occurs across a wet FGD when oxidized (or ionic) mercury converts back to its elemental form and subsequently returns to the process stream, increasing total mercury in stack emissions.

During the course of the present invention the inventors surprisingly discovered that a liquid suspension containing minimally soluble ferrous sulfide (FeS) containing aluminum hydroxide can efficiently and economically remove $Hg^{2+}$ by both absorption and adsorption mechanism while simultaneously minimizing any reconversion of $Hg^{2+}$ to $Hg^0$.

Though the combination of various molar ratios of a ferrous ion source (e.g. $FeCl_2$), an aluminum ion source (e.g. $Al(OH)_3$, $NaAlO_2$), a sulfide ion source (e.g. NaHS), and an alkalinity source (e.g. NaOH), the resulting alkaline liquid suspension containing FeS and aluminum hydroxide particles provides an economical and efficient wet scrubber liquid suitable for mercury removal from gas streams.

Since these combinations of various molar ratios of a ferrous ions, aluminum ions, sulfide ions, and an alkalinity source result in an alkaline liquid suspension containing different proportions of aforementioned ions in equilibrium with any FeS and aluminum hydroxide particles thus formed, the dominant or primary mechanism(s) controlling mercury removal from the flue gases may be different based on the desired specific formulation produced. Therefore, the discussion below of the dominant or primary mechanism(s) believed to control the mercury removal from the flue gases below should in no way be considered as limiting.

In the present invention, ferrous sulfide, sometimes referred to as "mackinawite", "disordered mackinawite", "amorphous ferrous sulfide" is formed which disassociates by the following reaction:

  (3)

Depending upon the environment in which the ferrous sulfide is formed, the solubility product (Ksp) will be between $1\times10^{-3}$ and $1\times10^{-5}$. Since this is many orders of magnitude higher than the solubility product of HgS (Ksp=$3\times10^{-52}$), in the presence of $Hg^{2+}$ that is present (or formed) in a wet scrubber system, the formation HgS is favored and rapid. By providing the sulfide ion in the form of a minimally soluble ferrous sulfide solid particle, only the stoichiometric amount of sulfide will enter the wet scrubber liquid that is necessary to precipitate any $Hg^{2+}$ and other metals, if any that form metal sulfide precipitates.

One advantage of the present invention as compared to the prior art, is the possibility of "over" or "under" dosing the required amount of sulfide necessary to precipitate the $Hg^{2+}$ is reduced.

Concurrent with the equilibrium mechanism controlling the concentration of sulfides released into the scrubber liquid, the same equilibrium mechanism also contributes in controlling the concentration of $Fe^{2+}$ ions in the scrubber liquid.

In accordance with reaction (3) above, since each mole of sulfide ion released (required) into the scrubber liquid one mole of $Fe^{2+}$ is also released, the $Fe^{2+}$ concentration is contemporaneously controlled and, especially in the presence high oxygen flue gas concentrations, the potential reduction of any $Hg^{2+}$ to ($Hg^0$) is reduced in accordance with reaction (1) above.

FIGS. 1a and 1b represent a "single cell" and a "sheet" of FeS, respectively. In these figures it is noted that each iron ion is "four-way" coordinated to each sulfur ion.

FIGS. 2a and 2b represent a "single cell" and a "sheet" of metacinnabar (β-HgS), respectively. In these figures it is noted that similar to FeS, each mercury ion is "four-way" coordinated to the sulfur ions.

Although the two structures in FIGS. 1a, 1b and 2a, 2b are very similar, the key difference is that FeS forms into sheets while the metacinnabar (β-HgS) tends to "bulk precipitate" and does not form into "sheets".

Mercury reacts with and dissolves FeS during the formation of metacinnabar (β-HgS).

Thus, another advantage of the present invention is that in addition to the removal of aqueous $Hg^{2+}$ by its combination with aqueous sulfide ions to form and insoluble HgS precipitate through absorption, the present invention also promotes removal of $Hg^{2+}$ through adsorption to the FeS particle surface.

In "Sorption of Mercuric Ion by Synthetic Nanocrystalline Mackinawite (FeS)", Hoon Y. Jeong, et. al., Environ. Sci. Technol. 2007 (41), 7699-7705, the authors concluded that in addition to absorption, an adsorption mechanism also contributes to the removal of $Hg^{2+}$ from aqueous solutions.

The removal mechanisms are dependent on the relative concentrations of $Hg^{2+}$ and FeS. When the molar ratio of $[Hg^{2+}]/[FeS]$ is as low as 0.05, adsorption is mainly responsible for $Hg^{2+}$ removal. As the molar ratio increases, the adsorption capacity becomes saturated and results in precipitation of HgS. Concurrently with HgS precipitation, the released $Fe^{2+}$ from FeS is resorbed by an adsorption mechanism in the acidic pH range and either adsorption or precipitation as iron (hydr)-oxides at neutral to basic pHs. Subsequently, the iron (hydr)-oxides precipitates formed at neutral to basic pHs may also serve as an adsorbent for $Hg^{2+}$.

Therefore, the proposed mechanisms for binding $Hg^{2+}$ to FeS are believed to involve precipitation as metacinnabar (β-HgS) and $Hg^{2+}$ adsorption to the FeS surface (EFeS) by the following reactions:

  (4)

  (5)

As used herein, adsorption is meant to encompass all processes responsible for $Hg^{2+}$ accumulation at the solid-liquid interface, including but not limited to surface complexation (at low surface coverage) and surface precipitation (at high surface coverage).

The present invention provides for the ability to adjust the molar ratios of the ferrous ion source, sulfide ion source, and alkalinity source so as to optimize the mercury removal efficiency of the scrubber liquid on a real-time, continuous basis. The ability to adjust the concentration of insoluble FeS in suspension, the ability to produce scrubber solutions with specified concentrations of ferrous ions (or sulfide ions) by adjusting the stoichiometry of the feedstocks, pH, or combinations of both offers unique flexibility to wet flue gas scrubber operators.

In addition to the proposed aforementioned mechanisms for removal of mercury from flue gas streams by iron sulfides in wet scrubbers, the presence of aluminum oxides or hydroxides (e.g. amorphous $Al(OH)_{3(s)}$, gibbsite, bayerite) are also effective in removing mercury from flue gases in wet scrubber systems.

According to one embodiment of the present invention the ferrous sulfide suspension may be produced from a caustic byproduct of an aluminum anodizing facility. According to this method in an aluminum anodizing facility solid aluminum is washed in a NaOH bath as follows:

$$2Al_{(s)} + 2NaOH + 2H_2O \leftrightarrow 2NaAlO_2 + 3H_{2(g)} \quad (6)$$

Eventually the bath becomes saturated with $NaAlO_2$ at which point aluminum hydroxide $(Al(OH)_3)$ precipitates in accordance with the reaction:

$$2NaAlO_2 + 4H_2O \leftrightarrow 2Al(OH)_{3(s)} + 2NaOH \quad (7)$$

Prior to this second reaction occurring and fouling the system the anodizing bath is sent for recycling. For purposes of the present invention the caustic byproduct is a saturated mixture of $NaAlO_2$, NaOH and possibly $Al(OH)_{3(s)}$.

Pickle liquor (primarily a mixture of $FeCl_2$, HCl and water) is mixed with the requisite amount of the caustic byproduct to achieve a final pH of about 8:

$$[Fe^{2+} + 2Cl^-] + [H^+ + Cl^-] + [Na^+ + Al^{3+} + 2O_2^-] + 2[Na^+ + OH^-] + [H^+ + OH^-] \leftrightarrow Fe^{2+} + Cl^- + Al(OH)_{3(s)} + 3NaCl + 2OH^- \quad (8)$$

In the resulting mixture $Al(OH)_{3(s)}$ precipitate as amorphous $Al(OH)_3$, gibbsite, or bayerite; the "NaCl" forms as a result of the "strong acid/strong base reaction", and the ferrous ion ($Fe^{2+}$) is predominately in solution.

Sodium hydrosulfide (NaHS) is added to the resulting mixture. Although there are an infinite number of possibilities, the present inventors believe that a variation of the reaction below is most likely. The amount of aqueous of solid products formed is dependent upon the initial stoichiometric amounts of the reactants and the final pH:

$$Fe^{2+} + Cl^- + Al(OH)_{3(s)} + 3NaCl + 2OH^- + [Na^+ + H^+ + S^{2-}] \leftrightarrow FeS_{(s)} + Al(OH)_{3(s)} + 4NaCl + H_2O + OH^-$$

Since the solubility of NaCl is high (360 g/L), the sodium and chloride ions are most likely in the aqueous phase. Upon drying, the NaCl will precipitate as halite (NaCl). The "aluminum hydroxide" fraction is in the form of a precipitate (e.g. amorphous $Al(OH)_{3(s)}$, gibbsite, bayerite). As stated previously, the $FeS_{(s)}$ formed is sometimes referred to as "mackinawite", "disordered mackinawite", "amorphous ferrous sulfide". Depending upon the stoichiometric amounts of NaHS added there may be excess aqueous sulfide ($S^{2-}$) or ferrous iron ($Fe^{2+}$).

The concentration of any individual solid phase is dependent upon numerous environmental factors (e.g. pH, temperature, other ions present, etc.). With respect to the "aluminum hydroxide phase" as it relates to the present invention, since the operating pH of most wet scrubbers is between 5 and 7, any aluminum hydroxide will be as solid particles given the low solubility product (Ksp approximately $1 \times 10^{-7}$ and $1 \times 10^{-8}$)

In "EXAFS study of mercury(II) sorption to Fe- and Al-(hydr)oxides: I. Effects of pH", Christopher S. Kim, et. al., Journal of Colloid and Interface Science 271 (2004), 1-15, and "EXAFS study of mercury(II) sorption to Fe- and Al-(hydr)oxides: II. Effects of Chloride and Sulfate", Christopher S. Kim, et. al., Journal of Colloid and Interface Science 270 (2004), 9-20, $Hg^{2+}$ adsorbs strongly as a corner-sharing bidentate, and edge-sharing bidentate complexes to the $Al(O,OH)_6$ octahedra that compose the bayerite structure. This adsorption of $Hg^{2+}$ is both inhibited and promoted in the presence of chloride and sulfate ions which are present in typical wet scrubber systems The authors noted that in the presence of bayerite and chloride concentrations ($C^- > 10^{-3}$) and at a pH of 6, the portion of aqueous $Hg^{2+}$ not sorbed to the bayerite surface facilitated reduction of the aqueous $Hg^{2+}$ to $Hg^+$ and the formation of $Hg_2Cl_{2(s)}$ (calomel) or $Hg_2Cl_{2(aq)}$ species. With respect to the present invention, this formation of $Hg_2Cl_{2(s)}$ or $Hg_2Cl_{2(aq)}$ species may benefit the overall removal efficiency in a wet scrubber by slowing or prohibiting the complete reduction of $Hg^{2+}$ to $Hg^{(0)}$ by $Fe^{2+}$ in accordance with equation (1) or (4).

Further, the authors noted that bayerite in the presence of sulfate ions ($SO_4^{2-}$), enhanced $Hg^{2+}$ sorption surface coverage. They postulated that is effect may be due to the sorption or accumulation of sulfate ions at the bayerite surface by effectively reducing the positive surface charge that electrostatically inhibits $Hg^{2+}$ sorption.

In summary, the FeS portion in the ferrous sulfide suspension promotes the formation of $HgS_{(s)}$ either by dissolution and/or the re-precipitation as HgS, or via binding of the $Hg^{2+}$ with the sulfhydryl groups on the FeS surface (e.g., $\equiv$FeS—Hg). Once this occurs, oxidation and dissolution reactions of the iron sulfides and mercury sulfides are significantly reduced. With respect to the bayerite, sulfate ions tend to promote direct $Hg^{2+}$ adsorption/accumulation at bayerite surfaces. Although chlorides tend to reduce surface uptake of $Hg^{2+}$ to bayerite, the formation of $Hg_2Cl_{2(s)}$ in the aqueous phase is overall beneficial by minimizing the complete reduction of $Hg^{2+}$ to $Hg^0$ and the potential for mercury re-emission.

The present invention will be discussed with reference to the following non-limiting examples which are to be considered merely representative of the present invention and, thus, should not be considered as limiting.

Example 1

In this example a ferrous sulfide suspension was tested at a facility with a 250 MW pulverized coal boiler burning bituminous coal. The boiler utilized an SCR to control $NO_X$, a baghouse to remove particulate, and a wet flue gas desulfurization (FGD) unit for $SO_2$ emission control. The test setup is shown in FIG. 3. Each scrubber had a working volume of approximately 30,000 gallons.

At the start of this example 60 gallons of the ferrous sulfide suspension was pumped into the discharge of each pump. The pumps supplied the ferrous sulfide suspension into each scrubber system at a rate of 6 gpm, so that it took approximate 10 minutes to get the 60 gallons into each scrubber system at the outlet of each side's recycle pump.

Within 5 minutes after the ferrous sulfide suspension was introduced into the scrubber towers, the total Hg trend dropped significantly from the Hg CEMS. The injection was then stopped for 2 hours after the initial charge of 60 gallons of ferrous sulfide suspension was pumped into the scrubber systems.

After the initial charge of the ferrous sulfide suspension tests were performed on a maintenance charge. The stack Hg level dropped below the baseline (1.3 lb/TBtu on average) value and settled at ~0.1 µg/dscm during the two hour window after the initial charge. When the Hg reading was observed to increase back to 50% of the baseline, a maintenance charge was started by the injection of the ferrous sulfide suspension at the lowest pumping rate of approximately 0.7 gpm through the pumps. The ferrous sulfide suspension maintenance injection lasted for 5 hours until the suspension was exhausted. Three runs of stack Hg testing which applied the EPA reference Method 30B were performed between 10:45 and 13:20, the testing results have been summarized in Table 1 below.

TABLE 1

Ferrous Sulfide Suspension Application Stack Hg Testing Results

| Date 2013 | Run # | Unit Load MW | Hg in Coal Blend lb/TBtu | Ferrous Sulfide Suspension Rate Gal/hr | FGD pH | M-P North FGD Inlet Hg (0) lb/TBtu | M-P North FGD Inlet HgT lb/TBtu | M-P Oxidation FGD Inlet % | M-P Stack Hg0 lb/TBtu | M-P Stack HgT lb/TBtu | Hg Re-Emission % | Overall Hg Removal % |
|---|---|---|---|---|---|---|---|---|---|---|---|---|
| Jul. 10 | 1 | 255 | 6.0 | 0 | N | 0.48 | 3.40 | 91.9 | 1.03 | 1.28 | 112.9 | 78.7 |
|  | 2 | 255 | 6.0 | 0 | N | 0.63 | 5.10 | 89.4 | 0.65 | 0.91 | 2.8 | 84.8 |
| Jul. 11 | 1 | 255 | 6.0 | 0 | N | 0.73 | 3.37 | 87.8 | 1.04 | 1.33 | 41.6 | 77.8 |
|  | 2 | 255 | 6.0 | 0 | N | 0.63 | 2.89 | 89.5 | 1.08 | 1.49 | 71.2 | 75.2 |
| Sep. 27 | 1 | 255 | 6.0 | 41 | N | 0.62 | 3.69 | 89.7 | 0.44 | 0.65 | −28.7 | 89.2 |
|  | 2 | 255 | 6.0 | 41 | N | 0.62 | 3.69 | 89.7 | 0.11 | 0.39 | −81.5 | 93.5 |
|  | 2 | 255 | 6.0 | 41 | N | 0.62 | 3.69 | 89.7 | 0.10 | 0.34 | −84.0 | 94.3 |

As indicated in Table 1, the baseline stack Hg (T) with no flue gas treatment averaged ~1.3 lb/TBtu; the Hg re-emission was determined to be 57.1% (the Hg(0) portion increased by 57.1% on average across the scrubber) and the overall Hg (T) removal efficiency was averaged at 79.1%.

During the ferrous sulfide suspension injection, the three runs of Method 30B were averaged at 0.46 lb/TBtu for the stack Hg(T), the Hg Re-emission column showed three negative numbers (−28.7%, −81.5% and −84.0%) which indicated that the Hg re-emission issue across the scrubber was completely eliminated, and the overall Hg(T) removal efficiency was determined to improve by 13% at 92.3% on average.

Example 2

In this example various amounts of the ferrous sulfide suspension were injected into the same 250 MW pulverized coal boiler burning bituminous coal used in Example 1.

Initial baseline mercury testing was as follows:

On Jul. 11, 2013, the overall Hg removal efficiency was 76.5%. Although the native Hg oxidation at the FGD inlet was 88.7%, test results showed a substantial increase (56%) in Hg0 across the wet FGD attributed to mercury re-emission.

On Jul. 25, 2013, the overall Hg removal efficiency was 75.0% and the native Hg oxidization at the wet FGD inlet was 98.3%. Test results again showed a substantial increase (1,200%) in mercury re-emission across the wet FGD.

Finally, on Nov. 11, 2013, the overall Hg removal efficiency was 87.8%, the native Hg oxidization at the wet FGD inlet was 97.0%. Hg0 increased by 239%.

The significant increase in $Hg^0$ attributed to mercury re-emission across the wet FGD prevented the unit from achieving a mercury emission level adequate to demonstrate compliance with the upcoming MATS regulatory limit of 1.20 lb/TBtu at baseline operating conditions.

On Nov. 12, 2013 series of injections of the ferrous sulfide suspension were performed for parametric testing. The objective of the testing was two-fold; first, to determine whether the ferrous sulfide suspension injection could stabilize $Hg^0$ through the wet FGD, and second, to estimate the required minimum injection rate of the ferrous sulfide suspension to provide steady-state control of stack Hg.

The target injections rates of the ferrous sulfide suspension used in this example were 40, 20, 10, and 5 gallons per hour (gph) into each of the two FGD scrubber modules. At each injection rate and after steady state conditions were achieved (~1.5 hours after initiating injection). The testing took three measurements of Hg in accordance with EPA Method 30B.

On Nov. 12, 2013 the ferrous sulfide suspension was injected at a rate of 40 gph/scrubber. Overall Hg removal efficiency was 95.1%. Total mercury decreased from 10.99 lb/TBtu to 0.59 lb/TBtu, and the $Hg^0$ fraction decreased from 0.90 lb/TBtu to 0.40 lb/TBtu. Results indicated the injection of the ferrous sulfide suspension successfully resolved the mercury re-emission issue and brought mercury emission levels within the MATS compliance limit of 1.2 lb/TBtu at the stack.

On Nov. 19, 2013 the ferrous sulfide suspension was injected at a rate to 20 gph/scrubber. The overall Hg removal efficiency was 96.1%, and the total mercury de-creased from 9.6 lb/TBtu to 0.46 lb/TBtu. The $Hg^0$ fraction decreased from 1.08 lb/TBtu to 0.30 lb/TBtu. Again, the ferrous sulfide suspension injection brought emissions levels within MATS compliance at 20 gph.

To determine if MATS compliance could be achievable with an even lower dosage the ferrous sulfide suspension was injected at a rate of 10 gph/scrubber during the November 19 testing. At this injection rate, overall Hg removal efficiency was 97.3%, total mercury decreased from 8.55 lb/TBtu to 0.33 lb/TBtu, and the $Hg^0$ fraction decreased from 0.93 lb/TBtu to 0.23 lb/TBtu. The injection of the ferrous sulfide suspension continued to demonstrate MATS compliance at the 10-gph rate.

On November 20 the ferrous sulfide suspension was injected at a rate to 5 gph/scrubber to establish an optimal rate for achieving compliance. The overall Hg removal efficiency was 95.8%, total mercury decreased from 9.88 lb/TBtu to 0.50 lb/TBtu, and the $Hg^0$ fraction decreased from 0.84 lb/TBtu to 0.31 lb/TBtu. Even at this low injection rate the ferrous sulfide suspension successfully brought the boiler stack emissions within the MATS compliance limits of <1.2 lb/TBtu.

The results of the tests performed in this example are presented in Table 2 below.

TABLE 2

Summary of Testing of Ferrous Sulfide Suspension at Different Injection Rates

| Date 2013 | Test B = Baseline P = Parametric | Hg in Coal lb/TBtu | Injection Amount GPH | FGD Inlet Hg0 lb/TBtu | FGD Inlet HgT lb/TBtu | FGD Inlet % Hg Oxidation | Stack Hg0 lb/TBtu | Stack HgT lb/TBtu | Stack % Hg Re-emission | System % Overall Hg Removal |
|---|---|---|---|---|---|---|---|---|---|---|
| Jul. 11 | B | 6 | 0 | 0.68 | 3.13 | 88.7 | 1.06 | 1.41 | 56 | 76.5 |
| Jul. 25 | B | 9 | 0 | 0.15 | 5.91 | 98.3 | 1.95 | 2.25 | 1200 | 75.0 |
| Nov. 11 | B | 12 | 0 | 0.36 | 6.72 | 97.0 | 1.21 | 1.46 | 239 | 87.8 |
| Nov. 12 | P | 12 | 40 | 0.90 | 10.99 | 92.5 | 0.40 | 0.59 | 0 | 95.1 |
| Nov. 19 | P | 12 | 20 | 1.08 | 9.60 | 91.0 | 0.30 | 0.46 | 0 | 96.2 |
| Nov. 19 | P | 12 | 10 | 0.93 | 8.55 | 92.3 | 0.23 | 0.33 | 0 | 97.3 |
| Nov. 20 | P | 12 | 5 | 0.83 | 9.88 | 93.0 | 0.31 | 0.50 | 0 | 95.8 |

From these tests it can be observed that even at the lowest injection rate of 5 gph the ferrous sulfide suspension appeared to stabilize oxidized mercury with no apparent increase of elemental mercury across the wet FGD.

In addition the ferrous sulfide suspension injection improved mercury removal efficiency of the overall system and reduced the total stack mercury to approximately 60% lower than the MATS limit of 1.2 lb/TBtu.

These results indicate further reduction of the ferrous sulfide suspension injection rates may also be achievable with long-term, continuous injections.

The results of these tests demonstrate that the ferrous sulfide suspension has the capacity to provide a cost-effective method for reducing mercury stack emissions and achieving compliance with up-coming USEPA MATS limits at coal-fired facilities.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A reagent for removal of mercury from industrial gases containing elemental and oxidized mercury which reagent comprises a ferrous sulfide suspension that is produced by the steps of:
   a) reacting a solution that contains at least $NaAlO_2$ and NaOH with a pickle liquor that contains $FeCl_2$, HCl and water to form a reaction mixture that contains $Fe^{2+}$, or, NaCl and $H_2O$; and
   b) adding NaHS to the reaction mixture of step a) to form a ferrous sulfide suspension that contains at least FeS and $Al(OH)_3$.

2. A reagent for removal of mercury from industrial gas containing elemental and oxidized mercury according to claim 1, the solution that contains at least $NaAlO_2$ and NaOH reacted in step a) comprises a caustic NaOH bath used for washing solid aluminum.

3. A reagent for removal of mercury from industrial gas containing elemental and oxidized mercury according to claim 1 wherein the reaction mixture of step a) has a pH of about 8.

4. A reagent for removal of mercury from industrial gas containing elemental and oxidized mercury according to claim 1, wherein the $Al(OH)_3$ comprises any combination of gibbsite, bayerite, or amorphous aluminum hydroxides.

5. A reagent for removal of mercury from industrial gas containing elemental and oxidized mercury according to claim 1, wherein the FeS comprises of any combination of "mackinawite", "disordered mackinawite", or "amorphous ferrous sulfide".

6. A method of reducing mercury emissions from an industrial gas containing elemental and oxidized mercury in a wet scrubber system containing an aqueous ferrous sulfide suspension which method comprises:
   a) creating a gas-liquid interface within the scrubber and contacting the industrial gas with the ferrous sulfide suspension so as to cause at least one of:
      i) adsorption of the oxidized or ionic mercury from the industrial gas onto the surface of ferrous sulfide in the ferrous sulfide suspension;
      ii) adsorption of the oxidized or ionic mercury onto iron (hydr)-oxides; and
      iii) precipitation of the oxidized or ionic mercury at a gas-liquid interface as a mercuric sulfide; and
   b) thereby reduce mercury emissions from an industrial gas.

7. The method of reducing mercury emissions from an industrial gas according to claim 6, wherein the industrial gas comprises a flue gas.

8. The method of reducing mercury emissions from an industrial gas according to claim 7, wherein the industrial gas comprises a flue gas from a coal-fired furnace or boiler.

9. The method of reducing mercury emissions from an industrial gas according to claim 6, wherein the ferrous sulfide suspension is caustic.

10. The method of reducing mercury emissions from an industrial gas according to claim 6, wherein the ferrous sulfide suspension comprises at least FeS and $Al(OH)_3$.

11. The method of reducing mercury emissions from an industrial gas according to claim 10, wherein the $Al(OH)_3$ comprises gibbsite, bayerite, or amorphous aluminum hydroxides.

12. The method of reducing mercury emissions from an industrial gas according to claim 10, wherein the FeS comprises mackinawite, "disordered mackinawite", or "amorphous ferrous sulfide".

* * * * *